(12) United States Patent
Wettling et al.

(10) Patent No.: US 9,688,791 B2
(45) Date of Patent: Jun. 27, 2017

(54) HIGH-REACTIVITY POLYISOBUTYLENE HAVING A HIGH CONTENT OF VINYLIDENE DOUBLE BONDS IN THE SIDE CHAINS

(71) Applicant: BASF SE, Ludwigshafen (DE)

(72) Inventors: Thomas Wettling, Limburgerhof (DE); Stefan Hirsch, Neustadt (DE); Markus Brym, Limburgerhof (DE); Markus Weis, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/905,658

(22) PCT Filed: Jul. 7, 2014

(86) PCT No.: PCT/EP2014/064402
§ 371 (c)(1),
(2) Date: Jan. 15, 2016

(87) PCT Pub. No.: WO2015/007553
PCT Pub. Date: Jan. 22, 2015

(65) Prior Publication Data
US 2016/0145362 A1 May 26, 2016

(30) Foreign Application Priority Data

Jul. 17, 2013 (EP) .................................... 13176789

(51) Int. Cl.
| | | |
|---|---|---|
| *C08F 110/10* | (2006.01) | |
| *C08F 210/10* | (2006.01) | |
| *C08F 8/00* | (2006.01) | |
| *C08F 8/28* | (2006.01) | |
| *C08F 8/30* | (2006.01) | |
| *C08F 8/32* | (2006.01) | |
| *C08F 8/46* | (2006.01) | |

(52) U.S. Cl.
CPC ............. *C08F 110/10* (2013.01); *C08F 8/00* (2013.01); *C08F 8/28* (2013.01); *C08F 8/30* (2013.01); *C08F 8/32* (2013.01); *C08F 8/46* (2013.01); *C08F 210/10* (2013.01); *C08F 2800/20* (2013.01)

(58) Field of Classification Search
CPC ............................ C08F 110/10; C08F 210/10
USPC ........................................................ 525/138
See application file for complete search history.

(56) References Cited

U.S. PATENT DOCUMENTS

| | | | | |
|---|---|---|---|---|
| 4,152,499 A | | 5/1979 | Boerzel et al. | |
| 4,849,572 A | * | 7/1989 | Chen .................... | B01J 19/0013 585/525 |
| 4,877,416 A | | 10/1989 | Campbell | |
| 4,973,733 A | * | 11/1990 | Valkovich ................. | C08F 8/30 508/464 |
| 5,561,095 A | * | 10/1996 | Chen ........................ | B01J 27/08 502/150 |
| 5,648,580 A | * | 7/1997 | Chen ........................ | B01J 27/08 208/115 |
| 5,962,604 A | * | 10/1999 | Rath ...................... | C08F 110/10 526/237 |
| 6,303,703 B1 | | 10/2001 | Kinder et al. | |
| 6,407,170 B1 | * | 6/2002 | Johnson .................... | C08F 8/00 516/128 |
| 6,407,186 B1 | | 6/2002 | Rath et al. | |
| 6,441,110 B1 | * | 8/2002 | Sigwart .................. | C08F 10/10 526/101 |
| 6,525,149 B1 | * | 2/2003 | Baxter, Jr. ........... | B01J 19/2425 526/133 |
| 6,562,913 B1 | * | 5/2003 | Baxter, Jr. ........... | B01J 19/2425 526/237 |
| 8,816,028 B2 | * | 8/2014 | Baxter, Jr. ................ | C08F 4/14 526/210 |
| 2004/0198937 A1 | * | 10/2004 | Auer ....................... | C08F 10/10 526/237 |
| 2010/0234542 A1 | * | 9/2010 | Blackborow ........... | C08F 10/10 526/77 |
| 2011/0045030 A1 | * | 2/2011 | Desai ...................... | A61L 27/16 424/400 |
| 2013/0317189 A1 | * | 11/2013 | Baxter, Jr. ................ | C08F 4/14 526/210 |

FOREIGN PATENT DOCUMENTS

| | | |
|---|---|---|
| DE | 27 02 604 A1 | 7/1978 |
| DE | 38 38 918 A1 | 5/1990 |
| DE | 0 628 575 A1 | 12/1994 |
| DE | 196 20 262 A1 | 11/1997 |
| EP | 0 244 616 A2 | 11/1987 |

(Continued)

OTHER PUBLICATIONS

International Search Report Issued Aug. 26, 2014 in PCT/EP14/064402 Filed Jul. 7, 2014.

International Search Report issued Aug. 26, 2014 in PCT/EP2014/064402 (English version was previously filed and with English translation of Categories of Cited Documents).

International Preliminary Report on Patentability and Written Opinion issued Jan. 19, 2016 in PCT/EP2014/064402 (with English language translation).

*Primary Examiner* — Mike M Dollinger

(74) *Attorney, Agent, or Firm* — Oblon, McClelland, Maier & Neustadt, L.L.P.

(57) ABSTRACT

A polyisobutylene having a total content of vinylidene double bonds of more than 50 mol % and a number-average molecular weight of 500 to 10 000 daltons, where at least 10% of all the vinylidene double bonds in the polyisobutylene are part of one or more side chains composed of at least 2 carbon atoms from the main polyisobutylene chain. Such a polyisobutylene is suitable for production of fuel and lubricant additives.

13 Claims, No Drawings

(56) References Cited

FOREIGN PATENT DOCUMENTS

| | | |
|---|---|---|
| EP | 0 310 875 A1 | 4/1989 |
| EP | 0 356 725 A1 | 3/1990 |
| EP | 0 476 485 A1 | 3/1992 |
| EP | 0 639 632 A1 | 2/1995 |
| EP | 0 700 985 A1 | 3/1996 |
| EP | 0 831 141 A1 | 3/1998 |
| WO | 96/03367 A1 | 2/1896 |
| WO | 90/10022 A1 | 9/1990 |
| WO | 93/10063 A1 | 5/1993 |
| WO | 9603479 A1 | 2/1996 |
| WO | 97/03946 A1 | 2/1997 |
| WO | 93/31151 A1 | 6/1999 |
| WO | 03/074577 A1 | 9/2003 |
| WO | 2004/067583 A1 | 8/2004 |
| WO | 2007/025700 A1 | 3/2007 |
| WO | 2012/004300 A1 | 1/2012 |

* cited by examiner

HIGH-REACTIVITY POLYISOBUTYLENE HAVING A HIGH CONTENT OF VINYLIDENE DOUBLE BONDS IN THE SIDE CHAINS

The present invention relates to a novel high-reactivity polyisobutylene having a high content of vinylidene double bonds in the side chains. The present invention further relates to a process for preparing such a polyisobutylene, to the use thereof for preparation of derivatives suitable as fuel and lubricant additives, and to a process for preparing such derivatives.

High-reactivity polyisobutylenes, as opposed to what are called low-reactivity polymers, are understood to mean those polyisobutylenes comprising a high content, i.e. of more than 50 mol %, of preferably terminal ethylenic vinylidene double bonds, in practice usually at least 60 mol %, especially at least 70 mol %, in particular at least 80 mol %.

Vinylidene double bonds in the context of the present application are understood to mean mono- or disubstituted double bonds of the formula $>C=CH_2$ in which one of the two free valences of the left-hand carbon atom is bonded directly or via a low molecular weight alkylene or alkenylene group to the main polymer chain and the other to a low molecular weight hydrocarbyl radical, for example a methyl group [the result: $—C(CH_3)=CH_2$], or to a hydrogen atom [the result: $—CH=CH_2$]. The vinylidene double bonds may be joined on at one end of the main polymer chain or closer to the middle of the length thereof—in the first case, a terminal vinylidene double bond ("α-double bond") is present, which makes up the predominant portion of the vinylidene double bonds in the molecule; in the second case, the vinylidene double bond is on a side chain (provided that this side chain does not form the longest chain in the molecule with the rest of the polymer backbone).

The vinylidene double bonds show the highest reactivity, for example in the thermal addition onto sterically demanding co-reactants such as maleic anhydride, whereas a double bond closer to the middle of the macromolecules in most cases exhibits lower reactivity, if any, in functionalization reactions. The uses of such high-reactivity polyisobutylenes include those as intermediates for production of additives for lubricants and fuels, as described, for example, in DE-A 27 02 604.

Such high-reactivity polyisobutylenes are obtainable, for example, by the process of patent specification DE-A 27 02 604 C2 (1), by cationic polymerization of isobutene in the liquid phase in the presence of pure boron trifluoride as a catalyst. Polyisobutylenes having a similarly high proportion of terminal vinylidene double bonds and having a relatively narrow molecular weight distribution are obtainable by effecting the polymerization in the presence of a boron trifluoride catalyst which has been deactivated with particular oxygen-containing organic compounds such as alcohols or ethers or mixtures of such compounds, as described, for example, in WO 93/10063 or in EP-A 0 628 575.

If the high-reactivity polyisobutylenes known from the prior art are used to produce customary derivatives which are to serve as fuel or lubricant additives, it is frequently found that the performance properties of such derivatives are in need of improvement. It was therefore an object of the present invention to provide a high-reactivity polyisobutylene from which it is possible to produce derivatives having improved performance properties over the former derivatives, more particularly improved cleaning and keep-clean action in intake valves and injection nozzles in gasoline engines.

Accordingly, a polyisobutylene has been found having a total content of vinylidene double bonds of more than 50 mol %, preferably of more than 60 mol %, especially of more than 70 mol %, particularly of more than 80 mol %, and a number-average molecular weight ($M_n$) of 500 to 10 000 daltons, preferably of 650 to 5000 daltons, especially of 750 to 3500 daltons, particularly of 900 to 2500 daltons, where at least 10%, preferably at least 11%, especially at least 12%, particularly 12 to 15%, of all the vinylidene double bonds of the polyisobutylene are part of one or more side chains composed of at least 2 carbon atoms from the main polyisobutylene chain.

In a preferred embodiment, this polyisobutylene simultaneously has a total content of vinylidene double bonds of more than 70 mol % and a number-average molecular weight ($M_n$) of 900 to 2500 daltons, where at least 10% of all the vinylidene double bonds in the polyisobutylene are part of one or more side chains composed of at least 2 carbon atoms from the main polyisobutylene chain.

The main polyisobutylene chain is regarded as being the longest carbon chain in the molecule. A vinylidene double bond arranged at the end of this main polyisobutylene chain ("α-double bond", i.e. in the α position in relation to the main chain) makes up the majority of the vinylidene double bonds in the molecule. This main polyisobutylene chain bears, as well as the regularly repeating methyl side chains which originate from the successive incorporation of the isobutene monomer units, a minimum number of side chains composed of at least 2, especially of at least 3, particularly of at least 4 carbon atoms, which comprise further vinylidene double bonds. In general, each of these side chains comprises one vinylidene double bond. Since this side chain is probably formed principally through the incorporation of monomeric isobutene and/or lower isobutene oligomers (usually composed of up to 5 isobutene units) at non-terminal positions in the growing main polyisobutylene chain, a majority of them typically have 4, 8, 12, 16 or 20 carbon atoms. As well as the incorporation of isobutene or isobutene oligomers, however, formation of such side chains is also conceivable through the incorporation of 1,3-butadiene units and/or of 1-butene units which are typically present in the isobutene used in relatively small amounts as impurities or as input stream constituents in the case of use of technical $C_4$ hydrocarbon streams, or through rearrangement reactions in the growing polymer molecule, in which case the side chains formed may also have a number of carbon atoms which differs from the abovementioned values of 4, 8, 12, 16 and 20.

The high-reactivity polyisobutylenes known from the prior art often also already have low contents of side chains bearing such vinylidene double bonds, but the proportion thereof is below 8%, usually about 2 to about 7.5%, based in each case on the total content of vinylidene double bond in the molecule. However, the performance properties of the fuel and lubricant additive derivatives produced from these polyisobutylenes are in need of improvement. The higher ratio of vinylidene double bonds in accordance with the invention in the side chains relative to terminal vinylidene double bonds in the main chain is responsible for the surprisingly better performance properties of the fuel and lubricant additive derivatives produced from the inventive polyisobutylene. Associated with the higher content of vinylidene double bonds in the side chains is a higher degree of branching of the overall molecule in relation to longer-chain side chains.

In a preferred embodiment, in the inventive polyisobutylene, vinylidene double bonds which are part of one or more side chains composed of at least 2, especially of at least 3, particularly of at least 4, more preferably of mainly 4, 8, 12, 16 or 20 carbon atoms, from the main polyisobutylene chain are each arranged in the α position (in relation to the side chain) at the distal end of the side chains, i.e. they are at the very end of the side chain and have predominantly—analogously to the structure of the terminal vinylidene double bonds on the main polyisobutylene chain—the particular reactive structure —C(CH$_3$)=CH$_2$.

The inventive high-reactivity polyisobutylene has, as well as the vinylidene double bonds mentioned at the end of the main chain and in the side chains, also a small proportion of more highly substituted (i.e. tri- and tetrasubstituted) ethylenic double bonds closer to the middle, which by their nature are less reactive in subsequent derivatization reactions. The content thereof should therefore be as small as possible compared to the vinylidene double bonds. The content of trisubstituted double bonds in the β position in the inventive polyisobutylene is generally 5 to 45 mol %, especially 8 to 35 mol %, particularly 12 to 25 mol %; the content of tetrasubstituted double bonds usually in the γ position in the inventive polyisobutylene is generally 1 to 10 mol %, especially 2 to 8 mol %, particularly 3 to 6 mol %, based in each case on the total content of all the olefinic double bonds in the molecule. The sum of the contents of vinylidene double bonds at the end of the main chain and in the side chains, of trisubstituted double bonds in the β position and of tetrasubstituted double bonds usually in the γ position is in all cases 100 mol %.

The contents of vinylidene double bonds at the end of the main chain and in the side chains, and also the contents of tri- and tetrasubstituted double bonds in the inventive polyisobutylene are typically determined by means of $^1$H NMR spectroscopy.

The inventive polyisobutylene has a number-average molecular weight ($M_n$) of 500 to 10 000 daltons, preferably 650 to 5000 daltons, especially 750 to 3500 daltons, particularly 900 to 2500 daltons, in each case measured by gel permeation chromatography (GPC). The polydispersity is typically less than 2.5, preferably 2.0 or less and especially 1.05 to 2.0. The polydispersity is a measure of the molecular weight distribution of the polymer chains obtained and corresponds to the quotient of weight-average molecular weight $M_w$ and number-average molecular weight $M_n$ (PDI=$M_w/M_n$).

The present invention also provides a process for preparing the inventive polyisobutylene, which comprises polymerizing, in a polymerization apparatus, isobutene or an isobutene-containing C$_4$ hydrocarbon mixture in the presence of a mixture of essentially isobutene oligomers composed of 2 to 5 isobutene units at temperatures of −100° C. to +100° C. by means of a Brønsted acid-based or Lewis acid-based polymerization catalyst, where the molar ratio of the vinylidene double bonds present in the isobutene oligomer mixture present in the polymerization medium to the double bonds in the isobutene monomer used is at least 1:100, preferably 1.2:100, especially 1.2:100 to 2.5:100.

The isobutene oligomer mixture present in the polymerization medium usually consists of oligomers having 2 to 5 isobutene units and small amounts of residual isobutene and higher oligomers having 6 or more isobutene units. The oligomers having 2 to 5 isobutene units make up generally at least 60% by weight, especially at least 75% by weight, particularly at least 90% by weight, of the isobutene oligomer mixture. The isobutene oligomer mixture normally has a distribution of the individual oligomer species in which the oligomers having 3 and 4 isobutene units are the most prevalent. Isolated individual isobutene oligomers can also bring about the formation of the inventive polyisobutylene.

The isobutene oligomer mixture can be obtained in situ in polymerization medium by suitable measures. In a preferred embodiment, the inventive polyisobutylene is prepared by separately preparing the mixture consisting of essentially isobutene oligomers composed of 2 to 5 isobutene units and introducing it into the polymerization medium before or during the polymerization of the isobutene or of the isobutene-containing C$_4$ hydrocarbon mixture.

The polymerization of the isobutene itself can in principle be performed in a manner known and customary to the person skilled in the art.

The polymerization catalyst used for isobutene is a homogeneous or heterogeneous catalyst from the class of the Brønsted or Lewis acids. More particularly, this catalyst comprises boron trifluoride or boron trifluoride complexes such as boron trifluoride etherates, e.g. boron trifluoride diethyl etherate, or boron trifluoride-alcohol complexes, for example with methanol, ethanol, isopropanol or sec-butanol. The polymerization catalysts used may also be tin tetrachloride, either alone or together with mineral acids or alkyl halides such as tert-butyl chloride as cocatalysts, and anhydrous aluminum chloride.

The polymerization catalysts used for isobutene may additionally also be complexes of aluminum trihalides such as aluminum trichloride or alkylaluminum halides, or of iron halides such as iron(III) chloride with donors such as alkyl carboxylates or especially dialkyl ethers such as dibutyl ether, optionally in the presence of an initiator such as an alcohol, a phenol or water. Another useful polymerization catalyst for isobutene has been found to be the complex of a Lewis acid such as aluminum trichloride or iron(III) chloride and a donor such as dibutyl ether in the presence of an organic sulfonic acid such as methanesulfonic acid as an initiator.

The polymerization catalyst is used generally in amounts of 0.001 to 10% by weight, especially 0.01 to 1% by weight, based in each case on the amount of isobutene used.

The isobutene polymerization is performed typically at temperatures of −100 to +100° C., especially of −50 to +25° C., particularly of −35 to +5° C. It is appropriate to work at a pressure of 10 to 5000 kPa.

The isobutene used for polymerization can in principle be used in the form of pure isobutene. It is more advantageous, however, to prepare the inventive polyisobutylene from technical C$_4$ hydrocarbon streams by controlled polymerization of the isobutene present therein—optionally after purification and/or concentration of the stream—obtained. These C$_4$ streams typically comprise, as well as isobutene, relatively large amounts of 1-butene and 2-butene, and relatively small amounts of 1,3-butadiene; in addition, significant proportions of butanes are often present. Such isobutene-comprising C$_4$ hydrocarbon streams are, for example, C$_4$ raffinates such as "raffinate 2" and especially "raffinate 1", C$_4$ cuts from isobutane dehydrogenation, C$_4$ cuts from steamcrackers and from FCC crackers (fluid catalysed cracking), provided that they have been substantially freed of 1,3-butadiene present therein. A C$_4$ hydrocarbon stream from an FCC refinery unit is also known as a"b/b" stream. Further suitable isobutene-comprising C$_4$ hydrocarbon streams are, for example, the product stream of a propylene-isobutane cooxidation or the product stream from a metathesis unit, which is generally used after customary purification and/or concentration. Suitable $C_4$ hydrocarbon streams comprise generally 3000 ppm by weight of butadienes or less. The presence of 1-butene and of cis- and trans-2-butene is substantially uncritical for the selective polymerization of isobutene.

Typically, the concentration of isobutene in the $C_4$ hydrocarbon streams mentioned is in the range from 30 to 60% by weight. For instance, raffinate 1 generally consists essentially of 30 to 50% by weight of isobutene, 10 to 50% by weight of 1-butene, 10 to 40% by weight of cis- and trans-2-butene, 2 to 35% by weight of butanes and 20 to 2000 ppm by weight of butadienes. In the polymerization process using raffinate 1, the behavior of the unbranched butenes is generally virtually inert under suitable reaction conditions, and only the isobutene is polymerized.

The polymerization process outlined can be effected batchwise or continuously.

The polymerization reaction is appropriately stopped by addition of water or of excess amounts of basic material, for example gaseous or aqueous ammonia or aqueous alkali metal hydroxide solution such as sodium hydroxide solution. After removal of unconverted $C_4$ monomers, the crude polymerization product is typically washed repeatedly with distilled or deionized water in order to remove adhering inorganic constituents. To achieve high purities or to remove unwanted low and/or high molecular weight components, the polymerization product can be fractionally distilled under reduced pressure.

The polymerization process according to the invention achieves an essentially halogen-free polyisobutylene having the desired high content of vinylidene double bonds and the desired ratio of vinylidene double bonds in the side chains and at the end of the main chain. The residual content of halogen, which is typically—according to the polymerization catalyst used—fluoride or chloride, is usually less than 150 ppm by weight, preferably less than 80 ppm by weight, especially less than 50 ppm by weight, particularly less than 15 ppm by weight.

The present application also provides for the use of the inventive polyisobutylene for production of derivatives suitable as fuel and lubricant additives.

Such additives suitable as fuel and lubricant additives are appropriately produced using a process for preparing polyisobutylene derivatives of the general formula I $$POL(-A)_n \quad (I)$$

in which

POL denotes the n-functional radical of the inventive polyisobutylene,

A is a low molecular weight polar group comprising in each case one or more amino functions and/or nitro groups and/or hydroxyl groups and/or mercaptan groups and/or carboxylic acid or carboxylic acid derivative functions, especially succinic anhydride or succinic acid derivative functions, and/or sulfonic acid or sulfonic acid derivative functions and/or aldehyde functions and/or silyl groups, and the variable n is a number from 1 to 10, preferably a number from 1 to 3, especially the number 1 or 2, particularly the number 1, where the variables A may be the same or different when n>1, which comprises reacting the inventive polyisobutylene with at least n equivalents of a compound which introduces the low molecular weight polar group A or a substructure of the low molecular weight polar group A and, in the case of reaction with a substructure, completing the formation of the low molecular weight polar group A by further reactions.

In a preferred embodiment of this process for preparing polyisobutylene derivatives (I), the low molecular weight polar group A is selected from (a) mono- or polyamino groups having up to 6 nitrogen atoms, where at least one nitrogen atom has basic properties;

(b) nitro groups, optionally in combination with hydroxyl groups;

(c) hydroxyl groups, optionally in combination with mono- or polyamino groups, where at least one nitrogen atom has basic properties;

(d) carboxyl groups or the alkali metal or alkaline earth metal salts thereof;

(e) sulfo groups or the alkali metal or alkaline earth metal salts thereof;

(f) polyoxy-$C_2$-$C_4$-alkylene moieties terminated by hydroxyl groups, by mono- or polyamino groups, where at least one nitrogen atom has basic properties, or by carbamate groups;

(g) carboxylic ester groups;

(h) succinic anhydride or moieties which derive from succinic anhydride and have hydroxyl and/or amino and/or quaternized amino and/or amido and/or imido groups, which have been prepared by thermal or halogen-catalyzed maleation of the internal double bonds and of the vinylidene double bonds of the parent polyisobutylene of the POL with maleic anhydride and, in the case of moieties which derive from succinic anhydride and have hydroxyl and/or amino and/or quaternized amino and/or amido and/or imido groups, by appropriate further reactions, and any resulting carboxamide or carboximide derivative can be modified by further conversion with at least one $C_2$- to $C_{12}$-dicarboxylic anhydride, with at least one $C_2$- to $C_4$-alkylene carbonate and/or with boric acid;

(j) moieties obtained by Mannich reaction of POL-substituted phenols with aldehydes and mono- or polyamines;

(k) phenol, alkylphenol or (hydroxyalkyl)phenol moieties;

(l) hydroxymethyl groups;

(m) moieties which have been obtained by epoxidation of the vinylidene double bonds of the parent polyisobutylene of the POL and subsequent (i) hydrolysis to the 1,2-diol,
 (ii) reaction with a thiol or a polythiol,
 (iii) reaction with ammonia, a monoamine or a polyamine,
 (iv) reaction with a borane to give a borate ester and oxidative cleavage of the borate ester to the 1,3-diol,
 (v) conversion to an aldehyde,
 (vi) conversion to an aldehyde and conversion of the aldehyde to an oxime and reduction of the oxime to the amine,
 (vii) conversion to an aldehyde and conversion of the aldehyde to an azomethine cation and hydrolysis to the amine,
 (viii) conversion to an aldehyde and conversion of the aldehyde to an alcohol or
 (ix) conversion to an aldehyde and conversion of the aldehyde to a Schiff base or an enamine and reduction of the Schiff base or of the enamine to the amine;

(n) moieties which have been obtained by hydroboration of vinylidene double bonds of the parent polyisobutylene of the POL and subsequent oxidation of the primary hydroboration product; and (o) moieties which have been obtained by hydrosilylation of vinylidene double bonds of the parent polyisobutylene of the POL.

Examples of the above low molecular weight polar A groups include the following:

Polyisobutylene derivatives (I) comprising mono- or polyamino groups (a) are obtainable, for example, according to EP-A 244 616 by hydroformylation and reductive amination with ammonia, monoamines or polyamines such as dimethylaminopropylamine, ethylenediamine, diethylenetrianine, triethylenetetramine or tetraethylenepentamine. When the preparation of the polyisobutylene derivatives (I) proceeds from polyisobutylene having a relatively high proportion of internal double bonds (usually in the β and γ position), another option is the preparation route by chlorination and subsequent amination or by oxidation of the double bond with air or ozone to give the carbonyl or carboxyl compound, and subsequent amination under reductive (hydrogenating) conditions. For the amination, it is possible here to use amines, for example ammonia, monoamines or polyamines, such as dimethylaminopropylamine, ethylenediamine, diethylenetriamine, triethylenetetramine or tetraethylenepentamine.

Further preferred polyisobutylene derivatives (I) comprising monoamino groups (a) are the hydrogenation products of the reaction products formed from a polyisobutylene having a mean degree of polymerization P=5 to 100 with nitrogen oxides or mixtures of nitrogen oxides and oxygen, as described especially in WO-A-97/03946.

Further preferred polyisobutylene derivatives (I) comprising monoamino groups (a) are the compounds obtainable from polyisobutene epoxides by reaction with amines and subsequent dehydration and reduction of the amino alcohols, as described especially in DE-A-196 20 262.

Polyisobutylene derivatives (I) comprising nitro groups (b), optionally in combination with hydroxyl groups, are preferably reaction products formed from a polyisobutylene of mean degree of polymerization P=5 to 100 or 10 to 100 with nitrogen oxides or mixtures of nitrogen oxides and oxygen, as described especially in WO-A-96/03367 and WO-A-96/03479. These reaction products are generally mixtures of pure nitropolyisobutylenes (e.g. α,β-dinitropolyisobutylene) and mixed hydroxynitropolyisobutylenes (e.g. α-nitro-β-hydroxypolyisobutylene).

Polyisobutylene derivatives (I) comprising hydroxyl groups in combination with mono- or polyamino groups (c) are especially reaction products of polyisobutene epoxides, obtainable from polyisobutylene with ammonia, mono- or polyamines, as described especially in EP-A-476 485. Polyisobutylene derivatives (I) which comprise hydroxyl groups (c) and do not have any mono- or polyamino groups are, for example, reaction products of polyisobutene epoxides with water (hydrolysis) or with alcohols such as methanol or ethanol, or the products of a reduction of the epoxy function, for example by means of lithiumaluminum hydride.

Polyisobutylene derivatives (I) comprising carboxyl groups or the alkali metal or alkaline earth metal salts thereof (d) are generally polyisobutylenes into which one or more carboxyl groups have been introduced, for example by reaction with maleic anhydride, and all or some of the carboxyl groups have then been converted to the alkali metal or alkaline earth metal salts and any remainder of the carboxyl groups has been reacted with alcohols or amines.

Polyisobutylene derivatives (I) comprising sulfo groups or the alkali metal or alkaline earth metal salts thereof (e) are generally polyisobutylenes into which one or more sulfo groups have been introduced, and all or some of the sulfo groups have then been converted to the alkali metal or alkaline earth metal salts and any remainder of the carboxyl groups has been reacted with alcohols or amines. Analogous alkali metal or alkaline earth metal salts of alkyl sulfosuccinates are described in EP-A-639 632. Such compounds serve principally to prevent valve seat wear and can be used advantageously in combination with customary fuel detergents such as poly(iso)butyleneamines or polyether amines.

Polyisobutylene derivatives (I) comprising polyoxy-$C_2$-$C_4$-alkylene moieties (f) are preferably polyethers or polyether amines, which are obtainable by reacting hydroxyl- or amino-containing polyisobutylenes with 1 to 30 mol of ethylene oxide and/or propylene oxide and/or butylene oxide per hydroxyl group or amino group and—in the case of polyetheramines—by subsequent reductive amination with ammonia, monoamines or polyamines. Analogous reaction products of $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with 1 to 30 mol of ethylene oxide and/or propylene oxide and/or butylene oxide per hydroxyl group or amino group are described in EP-A-310 875, EP-A-356 725, EP-A-700 985 and U.S. Pat. No. 4,877,416.

Polyisobutylene derivatives (I) comprising carboxylic ester groups (g) are preferably esters of mono-, di- or tricarboxylic acids with hydroxyl-containing polyisobutenes. Analogous reaction products of long-chain alkanols or polyols with mono-, di- or tricarboxylic acids are described in DE-A-38 38 918. The mono-, di- or tricarboxylic acids used may be aliphatic or aromatic acids. Typical representatives of such esters are corresponding adipates, phthalates, isophthalates, terephthalates and trimellitates.

Polyisobutylene derivatives (I) comprising succinic anhydride (h) are especially polyisobutenylsuccinic anhydrides, which are obtainable by reaction of polyisobutylene with maleic anhydride by a thermal route or via the corresponding chlorinated polyisobutylene. The polyisobutylene used may be reacted with 1 equivalent ("monomaleation"), with 2 equivalents of maleic anhydride ("bismaleation") or with 1<k<2 equivalents of maleic anhydride, for example with 1.05 to 1.3 equivalents of maleic anhydride.

Polyisobutylene derivatives (I) comprising moieties which derive from succinic anhydride and have hydroxyl and/or amino and/or quaternized amino and/or amido and/or imido groups (h) are preferably corresponding derivatives of polyisobutenyl-substituted succinic anhydride and especially the corresponding derivatives of polyisobutenylsuccinic anhydride which are obtainable by reaction of polyisobutylene having relatively high proportions of internal double bonds with maleic anhydride by a thermal route or via the chlorinated polyisobutylene. Of particular interest in this context are derivatives with alcohols such as methanethanol, ethanol, n-propanol, isopropanol, n-butanol, isobutanol, sec-butanol, tert-butanol or polyethers which have been prepared by alkoxylation of the low molecular weight alkanols mentioned with $C_2$- to $C_4$-alkylene oxides. The moieties with hydroxyl, optionally quaternized amino, amido and/or imido groups are, for example, carboxylic acid groups, acid amides of monoamines, acid amides of di- or polyamines which, as well as the amide function, also have free amine groups, succinic acid derivatives with an acid and an amide function, carboximides with monoamines, carboximides with di- or polyamines which, as well as the imide function, also have free amine groups, or diimides which are formed by the reaction of di- or polyamines with two succinic acid derivatives. Such compounds have been described as fuel additives in U.S. Pat. No. 4,849,572.

Polyisobutylene derivatives (I) comprising moieties which derive from succinic anhydride and have quaternized amino groups are understood to mean especially quaternized nitrogen compounds which are obtainable by addition of a compound comprising at least one oxygen- or nitrogen-containing group reactive with anhydride and additionally at least one quaternizable amino group onto polyisobutenyl-succinic anhydride, and subsequent quaternization, especially with an epoxide, especially in the absence of free acid, as described in WO 2012/004300. Suitable compounds having at least one oxygen- or nitrogen-containing group reactive with an anhydride and additionally at least one quaternizable amino group are especially polyamines having at least one primary or secondary amino group and at least one tertiary amino group. Such a quaternized nitrogen compound is, for example, the reaction product, obtained at 40° C., of polyisobutenylsuccinic anhydride in which the polyisobutenyl radical typically has an $M_n$ of 1000 with 3-(dimethylamino)propylamine, which is a polyisobutenyl-succinic monoamide and which is subsequently quaternized with styrene oxide in the absence of free acid at 70° C.

The resulting carboxamide and carboximide derivatives in group (h) can, especially when used in lubricant formulations to improve the swelling behavior of elastomers which are incorporated, for example, in seals of engines, units or devices which come into contact with the derivatives mentioned or with lubricant formulations comprising them, also be modified with at least one $C_2$- to $C_{12}$-dicarboxylic anhydride such as maleic anhydride or phthalic anhydride, with at least one $C_2$- to $C_4$-alkylene carbonate such as ethylene carbonate or propylene carbonate, and/or with boric acid.

Polyisobutylene derivatives (I) which comprise moieties (j) obtained by Mannich reaction of substituted phenols with aldehydes and mono- or polyamines are preferably reaction products of polyisobutyl-substituted phenols with aldehydes such as formaldehyde, which can also be used, for example, in oligomeric or polymeric form, for example as paraformaldehyde, and with monoamines, e.g. dimethylamine, diethylamine, propylamine, butylamine or morpholine, or with polyamines, e.g. ethylenediamine, diethylenetriamine, triethylenetetramine, tetraethylenepentamine or dimethylaminopropylamine. Such "polyisobutene Mannich bases" based on high-reactivity polyisobutene with $M_n$=300 to 5000 are described in EP-A-831 141.

Polyisobutylene derivatives (I) comprising phenol, alkylphenol or (hydroxyalkyl)phenol moieties (k) are especially the precursors to the polyisobutylene Mannich bases in group (j), which are formed by reaction of polyisobutylene with one or more appropriate phenols, optionally with subsequent reaction with an aldehyde. For this purpose, the polyisobutylene can be reacted, for example, with unsubstituted phenol, o-, m- or p-cresol, xylenol, hydroquinone, catechol or resorcinol. Polyisobutyl-substituted phenol thus formed can, for example, be converted further with an aldehyde, such as formaldehyde or paraformaldehyde, to a polyisobutyl-substituted hydroxyalkylphenol, especially a polyisobutyl-substituted hydroxymethylphenol, for example to 1-hydroxymethyl-4-polyisobutylphenol.

Polyisobutylene derivatives (I) comprising hydroxymethyl groups (l) are especially the intermediates in the hydroformylation of high-reactivity polyisobutene according to EP-A 244 616 in the presence of carbon monoxide and hydrogen by means of a suitable hydroformylation catalyst such as a rhodium or cobalt catalyst at temperatures of 80 to 200° C. and $CO/H_2$ pressures of up to 600 bar. A hydroxymethylpolyisobutylene thus obtained can be obtained as a product mixture together with a polyisobutylene comprising an aldehyde group.

The moieties which are listed in group (m) under (i) to (ix) and may be present in the polyisobutylene derivatives (I), and the production thereof, are described in detail in the context of further reactions of polyisobutylene epoxides, for example in WO 2007/025700, and are reproduced below:

The epoxide can, for example, be hydrolyzed with water to give 1,2-diols or reacted with thiols or primary or secondary amines to obtain, inter alia, glycol thioethers and amines.

Reaction of a polyisobutylene which, on average, has at least 0.7, preferably at least 0.9, epoxy group per molecule with polyols or especially polythiols, such as trimethylolpropane tris(3-mercaptopropionate) or pentaerythrityl tetrakis(3-mercaptopropionate), or polyamines, such as diethylenetriamine, affords networks which are advantageous owing to their elastic and damping properties.

In a preferred further reaction, the epoxide is rearranged to the aldehyde, which can be done, for example, with catalysis by means of aluminosilicates, for example, zeolites, acidic alumina, Lewis acids such as aluminum or zinc salts, e.g. zinc bromide, or protic acids such as sulfuric acid. The aldehyde is in turn a versatile starting material for valuable products. The conversion of polyisobutylene epoxides to aldehydes is described, for example, in WO 90/10022 and U.S. Pat. No. 6,303,703, or Organikum, 20th ed. 1999, Wiley-VCH, p. 615.

The aldehyde can be converted to an imine with ammonia or a primary amine, and the imine can be reduced, especially catalytically hydrogenated, to the amine. Suitable primary amines are, for example, diethylenetriamine, di(methylethylene)triamine, triethylenetetramine, tri(methylethylene)tetramine, tri(ethylethylene)tetramine, tetraethylenepentamine, pentaethylenehexamine, ethylenediamine, hexamethylenediamine, o-phenylenediamine, m-phenylenediamine, p-phenylenediamine, alkyl-substituted o-, m- and p-phenylenediamine, dimethylaminomethylamine, dimethylaminoethylamine, dimethylaminopropylamine, dimethylaminobutylamine, dimethylaminoheptylamine, diethylaminomethylamine, diethylaminopropylamine, diethylaminoamylamine, dipropylaminopropylamine, methylpropylaminoamylamine, propylbutylaminoethylamine, dimethylenetrianiline, methylenedianiline, polymethyleneaniline, and polyalkylmethyleneaniline. The reaction of the aldehyde with the primary amine and the hydrogenation of the resulting imine to a polyisobutenylamine is described in WO 90/10022.

The aldehyde can also be converted to an oxime, and the oxime reduced to the amine. Appropriately, hydroxylamine, which is obtained by neutralizing a hydroxylammonium salt, is used. The hydroxylamine reacts with the aldehyde to give the oxime. The oxime is then reduced by catalytic hydrogenation to the amine. The hydrogenation is effected at suitable temperature and pressure in the presence of a hydrogenation catalyst. Suitable catalysts are, for example, Raney nickel, nickel on kieselguhr, copper chromite, platinum on carbon, palladium on carbon and the like. The reaction is described, for example, in U.S. Pat. No. 6,303,703.

In a further preferred embodiment, the aldehyde is converted to an azomethine cation in a Leuckart reaction. To perform the Leuckart reaction, various reagents are suitable; ammonium formate is preferred. The azomethine cation can then be converted to an amine by hydrolysis. The hydrolysis can suitably be performed with dilute hydrochloric acid at moderately elevated temperature. Preference is given to using a phase transfer catalyst such as tricaprylylmethylammonium nitrate. The reaction is described, for example, in U.S. Pat. No. 6,303,703.

The epoxide can additionally be converted to a 1,3-diol, for example to 2-polyisobutenyl-1,3-propanediol, by reaction with a borane and subsequent oxidative cleavage of the borate ester formed. Suitable boranes are, for example, diborane ($B_2H_6$) and alkyl- and arylboranes. It is familiar to the person skilled in the art that such boranes can also be prepared in situ from a borohydride and an acid, usually $BF_3$ etherate. The reaction with the borane is effected suitably in a borane-coordinating solvent. Examples thereof are open-chain ethers such as dialkyl ethers, diaryl ethers or alkyl aryl ethers, and cyclic ethers, such as tetrahydrofuran or 1,4-dioxane, but solvents such as toluene, cyclohexane, and methylene chloride are also suitable. The oxidative cleavage to give a 1,3-diol can be effected, for example, by means of hydrogen peroxide in the presence of a base with heating to, for example, from 50 to 75° C. Suitable solvents for this purpose are ethers or mixtures of ethers and hydrocarbons.

Moieties (n) which result from hydroboration reactions and may be present in the polyisobutylene derivatives (I), and the production thereof, are described in detail, for example, in WO 2004/067583. General fundamentals of hydroboration are described in J. March, Advanced Organic Chemistry, $4^{th}$ edition, Verlag J. Wiley & Sons, p. 783-789.

The suitable borane sources include in particular borane ($BH_3$) itself, which typically occurs in the form of the dimer thereof ($B_2H_6$). Appropriately, the borane is obtained in situ by reaction of suitable precursors, especially of alkali metal or alkaline earth metal salts of the $BH_4$ anion with boron trihalides. Typically, sodium borohydride and boron trifluoride etherate are used here.

A preferred hydroboration agent for the vinylidene double bonds of the polyisobutylene is the reaction product of a borane source, for example borane obtained in situ from alkali metal or alkaline earth metal salts of the $BH_4$ anion with boron trihalides, with 0.5 to 1.8 equivalents per mole of borane of an alkene of molecular weight less than 250, for example 2-methyl-2-butene or 1-methylcyclohexene.

The subsequent oxidation of the primary hydroboration product is effected typically with alkaline hydrogen peroxide to obtain an alcohol, which preferably corresponds in formal terms to the anti-Markovnikov hydration product of the unsaturated isobutene polymer. Alternatively, the polyisobutylboranes obtained as the primary hydroboration product can also be subjected to an oxidative reaction with bromine in the presence of hydroxide ions to obtain the bromide.

Moieties (o) which result from hydrosilylation reactions and may be present in the polyisobutylene derivatives (I), and the production thereof, are described in detail, for example, in WO 2003/074577. For this purpose, the polyisobutylene can be subjected to a reaction with a silane in the presence of a silylation catalyst to obtain a polyisobutylene at least partly functionalized with silyl groups. Silylated polyisobutylenes are again valuable starting materials for further conversions to novel products, for example for moisture-curing sealing compounds and for formulations in which glass adhesion is important.

Suitable hydrosilylation catalysts are especially transition metal catalysts where the transition metal is selected from Pt, Pd, Rh, Ru and Ir, for example finely divided platinum, platinum chloride, hexachloroplatinic acid, tetramethyldivinyldisiloxane-platinum complexes, $RhCl[P(C_6H_5)_3]_3$, $RhCl_3$, $RuCl_3$ or $IrCl_3$. Suitable hydrosilylation catalysts are additionally Lewis acids such as aluminum trichloride or titanium tetrachloride, and peroxides.

Suitable silanes are, for example, halogenated silanes such as trichlorosilane, methyldichlorosilane, dimethylchlorosilane and trimethylsiloxydichlorosilane, alkoxysilanes such as trimethoxysilane, triethoxysilane, methyldimethoxysilane, phenyldimethoxysilane, 1,3,3,5,5,7,7-heptamethyl-1,1-dimethoxytetrasiloxane and acyloxysilanes.

The reaction temperature in the hydrosilylation is preferably in the range from 0 to 140° C., especially 40 to 120° C. The reaction is typically performed at standard pressures, but can also be effected at elevated pressures, for example at 1.5 to 20 bar, or reduced pressures, for example at 200 to 600 mbar. The reaction can be effected without solvent or in the presence of a suitable inert solvent such as toluene, tetrahydrofuran or chloroform.

In a preferred embodiment, the process according to the invention for preparing polyisobutylene derivatives of the general formula I in which A is a low molecular weight polar group comprising an amino function is performed by hydoroformylating the inventive high-reactivity polyisobutylene with a suitable catalyst in the presence of carbon monoxide and hydrogen, and then reductively aminating in the presence of at least n equivalents of ammonia or of a mono- or polyamine.

The hydroformylation and the reductive amination of high-reactivity polyisobutenes are described, for example, in EP-A 244 616. In this case, the hydroformylation is performed in the presence of carbon monoxide and hydrogen, typically by means of a suitable hydroformylation catalyst such as a rhodium or cobalt catalyst, at temperatures of 80 to 200° C. and $CO/H_2$ pressures of up to 600 bar. The subsequent reductive amination of the oxo product obtained (hydroxymethylpolyisobutene or product mixture of hydroxymethylpolyisobutene and polyisobutenealdehyde of the same carbon number) is effected generally at temperatures of 80 to 200° C. and hydrogen pressures of up to 600 bar, especially 80 to 300 bar.

In a further preferred embodiment, the process according to the invention for preparing polyisobutylene derivatives of the general formula I in which A is a low molecular weight polar group comprising an amino function is performed by treating the inventive high-reactivity polyisobutylene with a suitable activating agent, especially with chlorine, and then reacting the product with n equivalents of ammonia or of a mono- or polyamine.

In a further preferred embodiment, the process according to the invention for preparing polyisobutylene derivatives of the general formula I in which A is a low molecular weight polar group comprising a carboxylic acid derivative function, especially a carboximide function, is performed by reacting the inventive high-reactivity polyisobutylene with an ethylenically unsaturated $C_2$- to $C_{12}$-dicarboxylic acid or a reactive derivative thereof, especially with maleic anhydride, thermally or with halogen catalysis, and optionally subsequently converting the product with a mono- or polyamine to the corresponding carboxamide or carboximide derivative, and the resulting carboxamide or carboximide derivative can be modified by further reaction with at least one $C_2$- to $C_{12}$-dicarboxylic anhydride, with at least one $C_2$- to $C_4$-alkylene carbonate and/or with boric acid.

In a further preferred embodiment, the process according to the invention for preparing polyisobutylene derivatives of the general formula I in which A is a low molecular weight polar group comprising an amino function is performed by converting the inventive high-reactivity polyisobutylene with a phenol to the corresponding alkylphenol, and then converting the latter by reaction with an aldehyde and a primary or secondary amine to the corresponding Mannich adduct.

The novel inventive polyisobutylene having a high content of vinylidene double bonds in the side chains allows the production of derivatives suitable as fuel and lubricant additives, which have surprisingly better performance. More particularly, it is possible to use these to prepare high-reactivity polyisobutylene derivatives having improved performance properties compared to corresponding derivatives produced from conventional high-reactivity polyisobutene, more particularly improved cleaning and keep-clean action in intake valves and injection nozzles in gasoline engines.

The examples which follow are intended to illustrate the present invention without restricting it.

EXAMPLE 1

Preparation of an Inventive Polyisobutylene 9.0 l/h of an isobutene-containing reactant stream of the composition specified below, to which 100 g/h of an isobutene oligomer stream of the composition specified below had been added before feeding into the reactor, 8.0 g/h of boron trifluoride and 8.0 g/h of a mixture of 50% by volume of methanol and 50% by volume of isopropanol were metered into a continuous polymerization apparatus consisting of a jacket-cooled stirred reactor having a volume of 800 ml and a mechanical stirrer, a reactant introduction tube with precooling of the reactant, an inlet tube for gaseous boron trifluoride, a dropping funnel for the alcohol component and a suction stub for the continuous discharge of the reactor contents. The polymerization was conducted at internal reactor temperature –17° C. to –20° C. The flow rate (=reactant introduction rate=crude product discharge rate) was about 9.06 l/h.

The composition of the reactant stream which was classified as raffinate 1 (density: 0.6 g/l) was as follows:

| | |
|---|---|
| isobutene | 42.5% by wt. |
| 1-butene | 26.3% by wt. |
| trans-2-butene | 7.9% by wt. |
| cis-2-butene | 4.8% by wt. |
| isobutane | 6.1% by wt. |
| n-butane | 12.4% by wt. |
| butadiene | 338 ppm by wt. |

The composition of the isobutene oligomer stream (averaged molecular weight: 202.6 g/mol) was as follows:
3% by wt. C4
18% by wt. C8
24% by wt. C12
31% by wt. C16
17% by wt. C20
7% by wt. >C20

The molar ratio of the vinylidene double bonds present in the isobutene oligomer mixture present in the polymerization medium to the double bonds in the isobutene monomer used here was 1.2:100.

For workup, the initially still cold reactor output was treated with an excess of demineralized water at 70° C. and mixed vigorously. The amount of water was selected such that the mixing temperature of the two phases was 20° C. In the course of this, a portion of the solvent already evaporated. After a residence time of 20 minutes, the upper organic phase was removed and product samples were freed of the residual solvent in a rotary evaporator for the analysis (oil bath temperature: 150° C. at vacuum 30 mbar for 30 minutes).

This gave a polyisobutylene having a number-average molecular weight ($M_n$) determined by GPC of 975 daltons and a polydispersity of 1.83. The total content of vinylidene double bonds was 81.8 mol %, of which the content of terminal vinylidene double bonds (α-double bonds at the end of the main polymer chain) was 71.8 mol % and the content of vinylidene double bonds in the side chains was 10.0 mol % (in each case determined by means of $^1$H NMR); thus, 12.2% of all vinylidene double bonds were localized in the side chains. The other 18.2 mol % of double bonds were attributable to trisubstituted double bonds (14.1 mol %) and tetrasubstituted double bonds (4.1 mol %).

EXAMPLE 2

Preparation of a Noninventive Polyisobutylene

When the above-described example 1 was performed with feeding-in of only 10 g/h of the isobutene oligomer stream mentioned, the result was a polyisobutylene having a number-average molecular weight ($M_n$) determined by GPC of 993 daltons and a polydispersity of 1.85. The total content of vinylidene double bonds was 83.9 mol %, of which the content of terminal vinylidene double bonds (α-double bonds at the end of the main polymer chain) was 78.3 mol % and the content of vinylidene double bonds in the side chains 5.6 mol % (in each case determined by means of $^1$H NMR); thus, 7.2% of all vinylidene double bonds were localized in the side chains.

The molar ratio of the vinylidene double bonds present in the isobutene oligomer mixture present in the polymerization medium to the double bonds in the isobutene monomer used here was 0.1:100.

EXAMPLE 3

Preparation of a Noninventive Polyisobutylene

When the above-described example 1 was conducted without feeding in the separate isobutene oligomer stream, the result was a polyisobutylene having a number-average molecular weight ($M_n$) determined by GPC of 1017 daltons and a polydispersity of 1.86. The total content of vinylidene double bonds was 84.3 mol %, of which the content of terminal vinylidene double bonds (α-double bonds at the end of the main polymer chain) was 79.8 mol % and the content of vinylidene double bonds in the side chains 4.5 mol % (in each case determined by means of $^1$H NMR); thus, 5.3% of all vinylidene double bonds were localized in the side chains.

The invention claimed is:

1. A polyisobutylene, having a total content of vinylidene double bonds of more than 50 mol% and a number-average molecular weight ($M_n$) of 500 to 10,000 daltons, wherein at least 10% of all the vinylidene double bonds in the polyisobutylene are part of a side chain comprising at least 2 carbon atoms from the main polyisobutylene chain.

2. The polyisobutylene according to claim 1, having a total content of vinylidene double bonds of more than 70 mol% and a number-average molecular weight ($M_n$) of 900 to 2500 daltons, wherein at least 12% of all the vinylidene double bonds in the polyisobutylene are part of the side chain comprising at least 2 carbon atoms from the main polyisobutylene chain.

3. The polyisobutylene according to claim 1, wherein the vinylidene double bonds which are part of the side chain comprising at least 2 carbon atoms from the main polyisobutylene chain are each arranged in the α position at a distal end of the side chain.

4. The polyisobutylene according to claim 1, having a polydispersity of 1.05 to 2.0.

5. A process for preparing a polyisobutylene according to claim 1, comprising polymerizing, in a polymerization medium in a polymerization apparatus, isobutene or an isobutene-containing $C_4$ hydrocarbon mixture in the presence of a mixture consisting essentially of isobutene oligomers consisting of 2 to 5 isobutene units at temperatures of $-100°$ C. to $+100°$ C. with a Brønsted acid-based or Lewis acid-based polymerization catalyst, wherein a molar ratio of the vinylidene double bonds present in the isobutene oligomer mixture present in the polymerization medium to the double bonds in the isobutene monomer used is at least 1:100.

6. The process according to claim 5, wherein the mixture consisting essentially of isobutene oligomers consisting of 2 to 5 isobutene units is prepared separately and introduced into the polymerization medium before or during the polymerization of the isobutene or of the isobutene-containing $C_4$ hydrocarbon mixture.

7. The polyisobutylene according to claim 1, wherein the polyisobutylene is suitable for preparation of derivatives suitable as fuel and lubricant additives.

8. A process for preparing polyisobutylene derivatives of formula I $$POL(-A)_n \quad (I)$$

wherein
POL denotes the n-functional radical of a polyisobutylene according to claim 1,
A is a low molecular weight polar group comprising in each case one or more amino functions and/or nitro groups and/or hydroxyl groups and/or mercaptan groups and/or carboxylic acid or carboxylic acid derivative functions, and
the variable n is a number from 1 to 10, where the variables A may be the same or different when n >1,
the process comprising reacting the polyisobutylene with at least n equivalents of a compound which introduces the low molecular weight polar group A or a substructure of the low molecular weight polar group A and, in the case of reaction with a substructure, completing the formation of the low molecular weight polar group A by further reactions.

9. The process according to claim 8, wherein the low molecular weight polar group A is selected from
 (a) mono- or polyamino groups having up to 6 nitrogen atoms, where a nitrogen atom has basic properties;
 (b) nitro groups, optionally in combination with hydroxyl groups;
 (c) hydroxyl groups, optionally in combination with mono- or polyamino groups, where a nitrogen atom has basic properties;
 (d) carboxyl groups or the alkali metal or alkaline earth metal salts thereof,
 (e) sulfo groups or the alkali metal or alkaline earth metal salts thereof;
 (f) polyoxy-$C_2$-$C_4$-alkylene moieties terminated by hydroxyl groups, by mono- or polyamino groups, where a nitrogen atom has basic properties, or by carbamate groups;
 (g) carboxylic ester groups;
 (h) succinic anhydride or moieties which derive from succinic anhydride and have hydroxyl and/or amino and/or quaternized amino and/or amido and/or imido groups, which have been prepared by thermal or halogen-catalyzed maleation of the internal double bonds and of the vinylidene double bonds of the parent polyisobutylene of the POL with maleic anhydride and, in the case of moieties which derive from succinic anhydride and have hydroxyl and/or amino and/or quaternized amino and/or amido and/or imido groups, by appropriate further reactions, and any resulting carboxamide or carboximide derivative can be modified by further conversion with a $C_2$- to $C_{12}$-dicarboxylic anhydride, with a $C_2$- to $C_4$-alkylene carbonate and/or with boric acid;
 (j) moieties obtained by Mannich reaction of POL-substituted phenols with aldehydes and mono- or polyamines;
 (k) phenol, alkylphenol or (hydroxyalkyl)phenol moieties;
 (l) hydroxymethyl groups;
 (m) moieties which have been obtained by epoxidation of the vinylidene double bonds of the parent polyisobutylene of the POL and subsequent
  (i) hydrolysis to the 1,2-diol,
  (ii) reaction with a thiol or a polythiol,
  (iii) reaction with ammonia, a monoamine or a polyamine,
  (iv) reaction with a borane to give a borate ester and oxidative cleavage of the borate ester to the 1,3-diol,
  (v) conversion to an aldehyde,
  (vi) conversion to an aldehyde and conversion of the aldehyde to an oxime and reduction of the oxime to the amine,
  (vii) conversion to an aldehyde and conversion of the aldehyde to an azomethine cation and hydrolysis to the amine,
  (viii) conversion to an aldehyde and conversion of the aldehyde to an alcohol or
  (ix) conversion to an aldehyde and conversion of the aldehyde to a Schiff base or an enamine and reduction of the Schiff base or of the enamine to the amine;
 (n) moieties which have been obtained by hydroboration of vinylidene double bonds of the parent polyisobutylene of the POL and subsequent oxidation of the primary hydroboration product; and
 (o) moieties which have been obtained by hydrosilylation of vinylidene double bonds of the parent polyisobutylene of the POL.

10. The process according to claim 8, wherein A is a low molecular weight polar group comprising an amino function, wherein the polyisobutylene is hydroformylated with a suitable catalyst in the presence of carbon monoxide and hydrogen and then reductively aminated in the presence of at least n equivalents of ammonia or of a mono- or polyamine.

11. The process according to claim 8, wherein A is a low molecular weight polar group comprising an amino function, wherein the polyisobutylene is treated with a suitable activator, especially with chlorine, and then reacted with n equivalents of ammonia or of a mono- or polyamine.

12. The process according to claim 8, wherein A is a low molecular weight polar group comprising an amino function, wherein the polyisobutylene is reacted with an ethylenically unsaturated $C_4$- to $C_{12}$-dicarboxylic acid or a reactive derivative thereof, especially with maleic anhydride, thermally or with halogen catalysis and then optionally converting it with a mono- or polyamine to the corresponding carboxamide or carboximide derivative, and the resulting carboxamide or carboximide derivative can be modified by further reaction with at least one $C_2$- to $C_{12}$-dicarboxylic anhydride, with at least one $C_2$- to $C_4$-alkylene carbonate and/or with boric acid.

13. The process according to claim 8, wherein A is a low molecular weight polar group comprising an amino function, wherein the polyisobutylene is converted with a phenol to the corresponding alkylphenol and the latter is subsequently converted by reaction with an aldehyde and a primary or secondary amine to the corresponding Mannich adduct.

* * * * *